(12) United States Patent
Shuster

(10) Patent No.: US 6,763,379 B1
(45) Date of Patent: Jul. 13, 2004

(54) SYSTEM, APPARATUS AND METHOD FOR PRESENTING AND DISPLAYING CONTENT ON A WIDE AREA NETWORK

(75) Inventor: Gary Shuster, Oakland, CA (US)

(73) Assignee: Ideaflood, Inc., Zephyr Cove, NV (US)

( * ) Notice: Subject to any disclaimer, the term of this patent is extended or adjusted under 35 U.S.C. 154(b) by 0 days.

(21) Appl. No.: 09/419,701

(22) Filed: Oct. 14, 1999

(51) Int. Cl.$^7$ ................................................ G06F 15/16
(52) U.S. Cl. ........................................ 709/224; 709/219
(58) Field of Search ................................. 709/203, 204, 709/202, 217, 227; 345/760, 714, 733, 730, 738, 744, 745, 772, 774, 808; 707/10; 705/14

(56) References Cited

U.S. PATENT DOCUMENTS

| | | | | |
|---|---|---|---|---|
| 5,075,675 A | * | 12/1991 | Barker et al. ............... | 345/808 |
| 5,572,643 A | * | 11/1996 | Judson .................... | 379/88.13 |
| 5,737,619 A | * | 4/1998 | Judson ....................... | 707/500 |
| 5,740,549 A | * | 4/1998 | Reilly et al. ................. | 705/14 |
| 5,796,952 A | * | 8/1998 | Davis et al. ................. | 709/224 |
| 5,887,133 A | * | 3/1999 | Brown et al. ............... | 709/206 |
| 5,938,727 A | * | 8/1999 | Ikeda ......................... | 709/218 |
| 5,946,646 A | * | 8/1999 | Schena et al. .............. | 345/733 |
| 5,959,621 A | * | 9/1999 | Nawaz et al. ............... | 345/733 |
| 6,011,537 A | * | 1/2000 | Slotznick ..................... | 345/700 |
| 6,018,619 A | * | 1/2000 | Allard et al. ................. | 709/211 |
| 6,067,570 A | * | 5/2000 | Kreynin et al. ............. | 345/808 |
| 6,084,583 A | * | 7/2000 | Gersberg et al. .......... | 345/719 |
| 6,119,098 A | * | 9/2000 | Guyot et al. .................. | 705/14 |
| 6,122,658 A | * | 9/2000 | Chaddha ..................... | 709/203 |
| 6,138,155 A | * | 10/2000 | Davis et al. ................. | 709/224 |
| 6,272,493 B1 | * | 8/2001 | Pasquali ....................... | 707/10 |
| 6,275,854 B1 | * | 8/2001 | Himmel et al. ............. | 709/224 |
| 6,279,112 B1 | * | 8/2001 | O'Toole et al. ............... | 705/14 |
| 6,314,451 B1 | * | 11/2001 | Landsman et al. .......... | 709/202 |
| 6,317,782 B1 | * | 11/2001 | Himmel et al. ............. | 709/224 |
| 6,317,791 B1 | * | 11/2001 | Cohn et al. ................. | 709/227 |
| 6,321,209 B1 | * | 11/2001 | Pasquali ....................... | 705/14 |
| 6,339,438 B1 | * | 1/2002 | Bates et al. ................. | 345/787 |
| 6,345,293 B1 | * | 2/2002 | Chaddha ..................... | 709/219 |
| 6,389,458 B2 | * | 5/2002 | Shuster ........................ | 345/760 |
| 6,393,407 B1 | * | 5/2002 | Middleton, III et al. ...... | 705/14 |
| 6,421,733 B1 | * | 7/2002 | Tso et al. .................... | 709/246 |

\* cited by examiner

*Primary Examiner*—Marc D. Thompson
(74) *Attorney, Agent, or Firm*—O'Melveny & Myers LLP

(57) ABSTRACT

Embodiments of the instant invention are directed to a system, apparatus and method for monitoring a user's activities and displaying and presenting unsolicited content to users over a wide area network. Embodiments of the instant invention include a monitoring system comprising an activity monitor and a content transfer and display means, wherein the activity monitor comprises an event identifier and a timer. The monitoring system monitors user activities, identifies trigger events, measures the elapsed time of inactivity of the user and initiates the presentation of unsolicited data, or content, to the user computer. In general, the monitoring system identifies trigger events and measures the elapsed time between trigger events. If the elapsed time between the trigger events exceeds a predefined time period the monitoring system causes unsolicited data to be presented on the user computer.

20 Claims, 3 Drawing Sheets

SYSTEM, APPARATUS AND METHOD FOR PRESENTING AND DISPLAYING CONTENT ON A WIDE AREA NETWORK

FIELD OF THE INVENTION

This invention is directed to a system, apparatus and method for monitoring a user's activities, and displaying content to the users on a wide area network with minimal disruption in the user's activity. More specifically, embodiments of the invention direct and display content to users on inactive windows so as to reduce disruption of the user's activities.

BACKGROUND OF THE INVENTION

Wide area networks, such as the World Wide Web ("WWW") or the Internet, have become increasingly popular modalities for the advertisement of products or to present unsolicited content to users. Indeed, much like broadcast medium, for example, radio and television, advertisers sponsor content in exchange for the right to present unsolicited content to users, such as, for example, an advertisement. Indeed, advertisers sponsor most of the content on the WWW. The sponsorship provided by the advertiser supports the host providers and facilitates free hosting for individual users.

In exchange for free content support, and therefore, free hosting of individual web sites, advertisers desire to display their advertisements as frequently as possible. Current advertising on the WWW is typically in the form of a small banner or a pop-up window. The banner advertisements are usually placed at the top or bottom of the page. The banner itself is usually insufficient in its advertising message to the consumer. As such, to review the banner advertisement, the user must click on the banner and load the advertisement.

The pop-up window is another form of advertisement. Pop-up advertisements open when a new browser window is opened, wherein the pop-up advertisement appears in front of the user's primary window. As with the banner advertisements, the user must click on the advertisement to view the advertisement.

As evinced above, current advertisement methods require some affirmative action on from the user. Further, current advertising methods are intrusive and interrupt the user's activities. Indeed, unlike broadcast medium, wherein the advertisements are placed in between the content of the main programming, advertisements on the WWW, which can be displayed at any time, are usually displayed over, or with, the content that the user is viewing, and require affirmative action by the user. As most users do not desire to be interrupted in their activities, most users avoid reviewing the advertisements. Indeed, some users avoid sites with highly intrusive advertisements.

A need in the industry exists for a modality of presenting unsolicited content to users wherein the user is not required to affirmatively respond to view the content. A further need exists for a modality of displaying unsolicited content wherein the presentation of the content does not interrupt the user's activities, but rather, occurs during a disruption in the user's review of desired content.

SUMMARY OF THE DISCLOSURE

Embodiments of the instant invention are directed to a system, apparatus and method for monitoring a user's activities and displaying and presenting unsolicited content to users, wherein the user is not required to affirmatively respond in order to review the content. Furthermore, embodiments of the instant invention are directed to a method for presenting unsolicited content such that the presentation of the content does not disrupt the user's review of other content that the user has chosen to review. Other method and apparatus for accomplishing similar objectives are disclosed in the co-pending application Ser. No. 09/419, 698, filed by the inventor hereof on Oct. 14, 1999, which is incorporated herein by reference.

Embodiments of the instant invention include a monitoring system 30 comprising an activity monitor 32 and a content transfer and display means 34, wherein the activity monitor 30 comprises an event identifier 36 and a timer 38. The monitoring system 30 monitors user activities, identifies trigger events, measures the elapsed time of inactivity of the user and initiates the presentation of unsolicited data, or content, to the user computer 12. In general, the monitoring system 30 identifies trigger events and measures the elapsed time between trigger events. If the elapsed time between the trigger events exceeds a predefined time period the monitoring system 30 causes unsolicited data to be presented on the user computer 12.

A feature of preferred embodiments of the invention is an activity monitor. An advantage to this feature is that the activity of the user can be monitored to determine whether the user has suspended his activities. A further advantage of this feature is that the user can be presented with unsolicited content during the period of suspended activities.

Another feature of preferred embodiments of this invention is that the unsolicited data is presented in its full format to the user. An advantage to this feature is that the user is not required to affirmatively access the data to review the data.

The above and other features and advantages of embodiments of this invention will be apparent from the following more detailed description when taken in conjunction With the accompanying drawings of illustrative embodiments.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF PREFERRED EMBODIMENTS

Embodiments of the instant invention are directed to a system, apparatus and method for monitoring a user's activities and displaying and presenting unsolicited content to users over a wide area network, wherein the presentation of the content is minimally disruptive of the user's activity and wherein the user is not required to affirmatively respond to view the content. Embodiments of the instant invention employ a network of computers and programs for presenting unsolicited content to users on the network.

Hardware Environment

Figure 1:
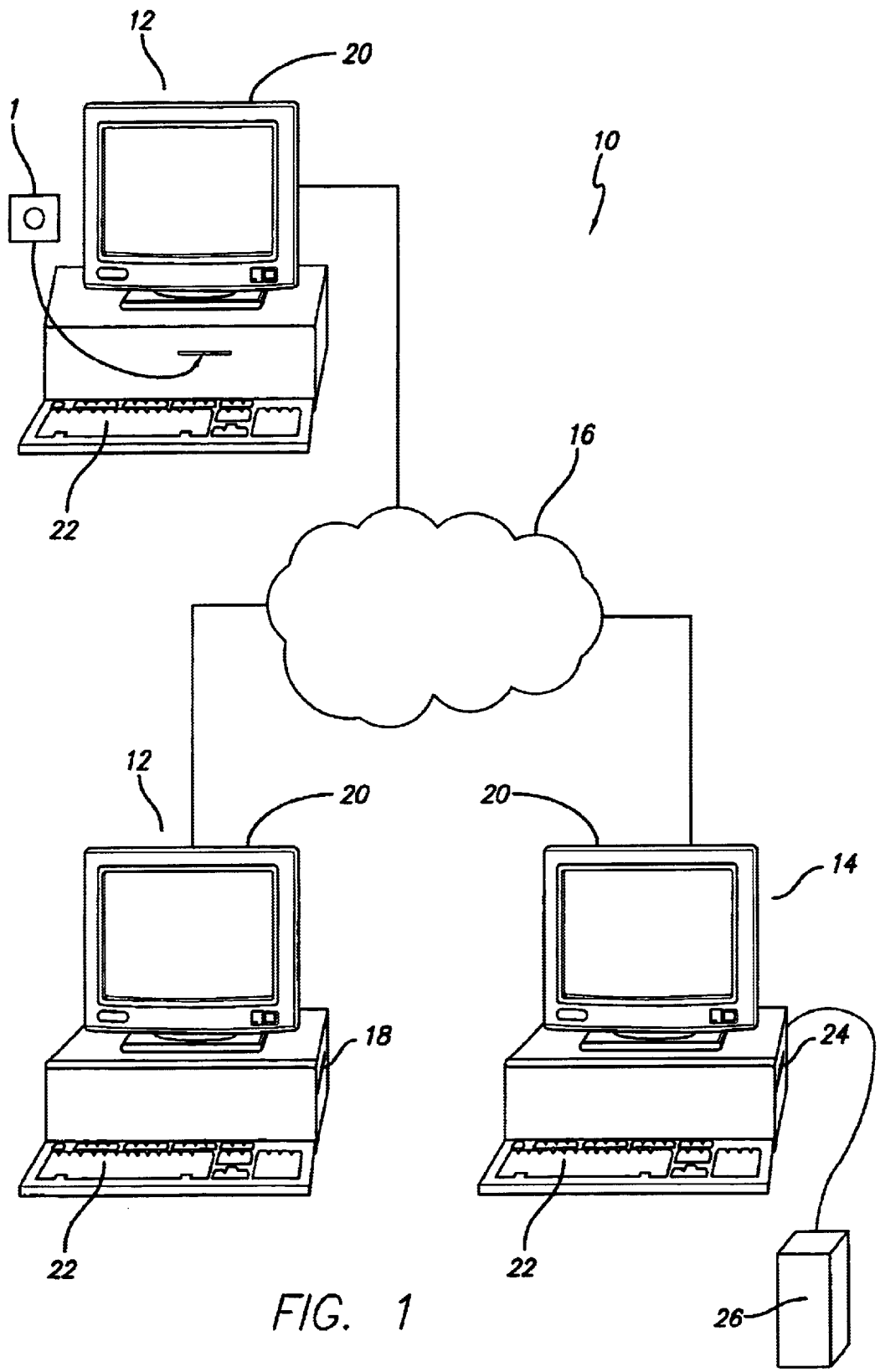
FIG. 1 is a network system environment in accordance with a preferred embodiment of the instant invention.

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least one client or user computer 12 and at least one content provider or server computer 14 coupled for communication therebetween by the remainder of the network, generally represented at 16. In the illustrated embodiment, two client or user computers 12 and one content provider computer 14 are shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

The user computer 12 is controlled by suitable software, including network communication and browser software to allow a user to request, receive and display information (or content) from or through a content provider computer 14 on the network system 10. In preferred embodiments, the user computer 12 employs a program, such as a browser, for displaying content received from a provider computer 14.

The content provider computer 14 may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media 24 (for example, but not limited to, floppy disks, hard disks, random access memory RAM, CD-ROM), to provide content for communication to a user computer 12. The provider computer 14 may comprise, for example, but not limited to, a personal computer, a mainframe computer, network computer, portable computer, personal data assistant (such as, a 3Com Palm Pilot), or the like. The provider computer 14 may include one or more internal data storage devices (not shown) for storing content for communication to a user computer 12. Alternatively, or in addition, the provider computer 14 may be coupled to an external data storage device, computer or other means, generally represented at 26, from which the provider computer 14 may obtain content for communication to a user computer 12. In one embodiment, the external device 26 may comprise a further network device coupled in the network 16.

General Description of Preferred Embodiments

Embodiments of the instant invention utilize suspension time, or disruptions, in the user's review of content in a particular window or document. As is commonly understood, current computer operating systems are capable of performing multiple tasks simultaneously. For instance, users can open a browser, a word processor and their E-mail at the same time, thereby allowing the convenience of moving between these applications. Indeed, when users have completed reviewing the content in a particular application, for example, E-mail, many users simply move to another application without closing the application most recently reviewed. Thus, for example, a user might review a browser window on a web site and switch to review his E-mail. In this instance, review of the content on the browser window is temporarily, or permanently, suspended or interrupted due to the user's actions. Similarly, users may become distracted by other non-computer related activities and simply leave the browser window open while they engage in these other non-computer related activities. For instance, a user might answer the telephone or send a facsimile.

Figure 2:
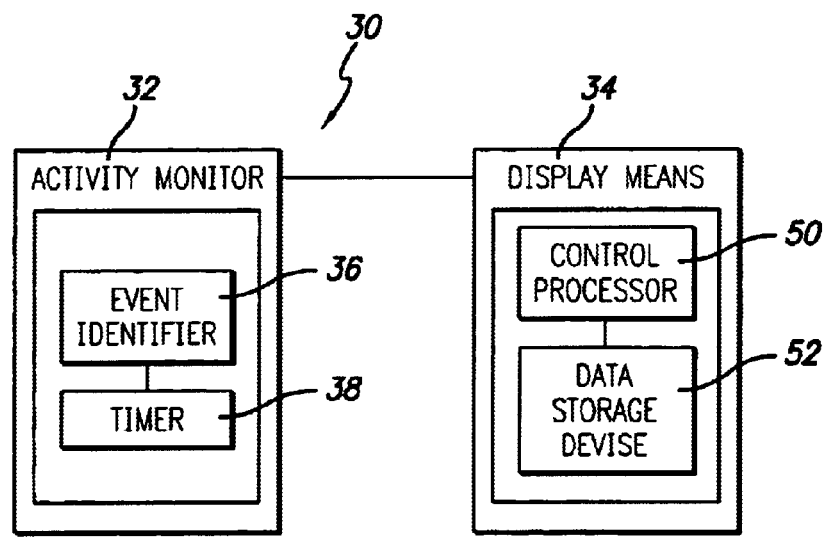
FIG. 2 is a schematic of a monitoring system in accordance with a preferred embodiment of the instant invention.

With reference to FIG. 2, embodiments of the instant invention are directed to a monitoring system 30 comprising an activity monitor 32 and a content transfer and display means 34, wherein the activity monitor 30 comprises an event identifier 36 and a timer 38. The monitoring system 30 monitors user activities, identifies trigger events, measures the elapsed time of inactivity of the user and initiates the presentation of unsolicited data, or content, to the user computer 12. In general, the monitoring system 30 identifies trigger events and measures the elapsed time between trigger events. If the elapsed time between the trigger events exceeds a predefined time period, or suspension period, the monitoring system causes unsolicited data to be presented on the user computer 12. In one embodiment, the monitoring system 30 is written in JavaScript, although other programming languages, including, but not limited to, Java Active X is also suitable.

The activity monitor 32 is a software program that resides on the provider computer 14. To effectively operate however, the activity monitor 32 is copied to the user computer 12. As illustrated in FIG. 1, the user computer 12 can be coupled or networked to the provider computer 14 via the network 16. In preferred embodiments, the user requests content from the provider computer 14. The provider computer 14 responds to the user's request for content by transmitting, that is, downloading content data for one or more Hypertext Markup Language ("HTML") frames, corresponding to the user-requested content. In addition, the activity monitor 32 is also transmitted or downloaded, preferably with the content data. Upon receipt of the content data and the activity monitor 32, the user computer generates a display corresponding to the content data associated with the HTML frame. In addition, the activity monitor 32 is initiated on the user computer 12. The monitoring software downloaded to the user computer includes executable code and commands that are designed to interact with the user's browser's software.

Upon the download of data to the user computer 12, the activity monitor 32 is initiated, wherein all of the open applications, including, the browser window, documents, graphics and links are recognized by the activity monitor 32. During the initiation of the monitoring software, the activity monitor 32 is effectively coupled to the open applications, including the content downloaded to the user computer 12 by the provider computer 14.

Figure 3:
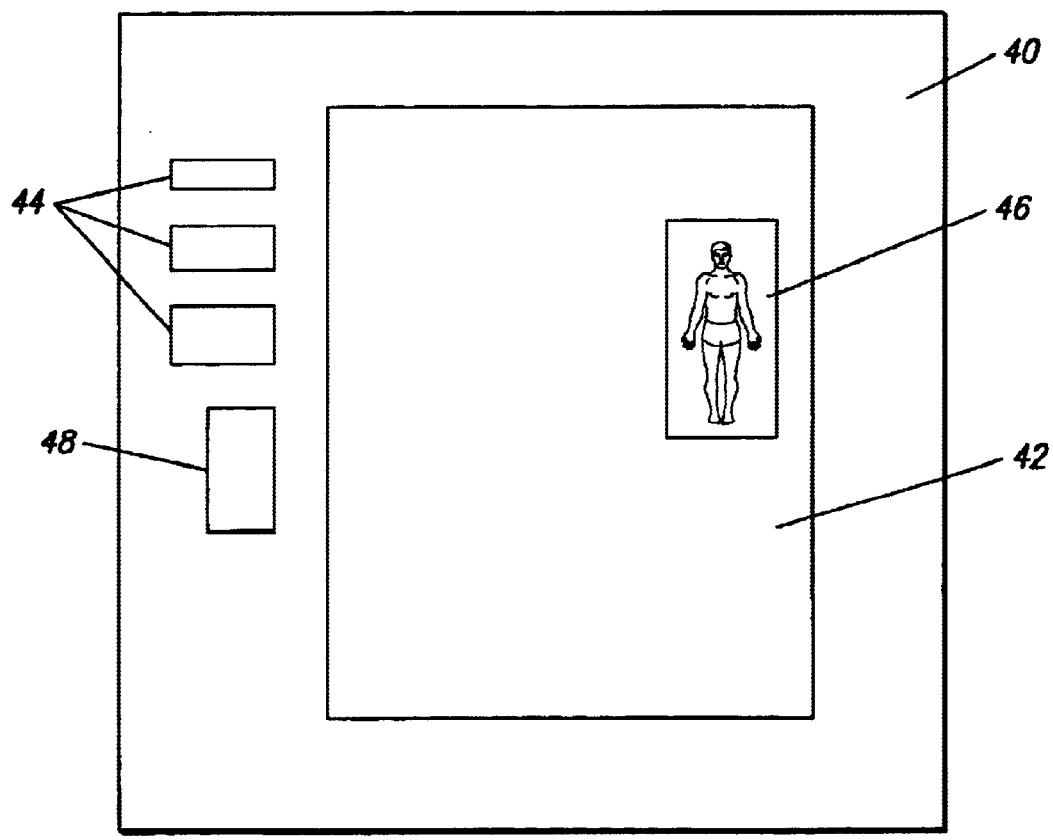
FIG. 3 is a representative browser window, wherein the browser window includes an open document and links for other documents, graphics and forms.

With reference to FIG. 3, in preferred embodiments, the coupling of the activity monitor 32 occurs on a top down basis for the data. For instance, the activity monitor 32 is coupled to the window 40 initially loaded by the user. Then, the specific document 42 selected from the window 40 and all associated links 44, graphics 46 and forms 48 of the document 42 are coupled to the activity monitor 32. In this manner, the activity monitor 32 can monitor the activity of the user with respect to the browser window via the event identifier 34 and timer 36.

Once the activity monitor 32 determines that the user has suspended his activity, as more fully described below, the content transfer and display means 34 downloads unsolicited data. The transfer and display of content across a set of networked computers is well known in the art. Thus, only a general description is provided herein. The content transfer and display means 34 comprises a processor (not shown) and a storage device, such as an internal storage device (not shown) or an external storage device 26 (see FIG. 1). The content transfer and display means 34 cooperates with the activity monitor 32 in the selection of the content and the time in which to download the content.

Figure 4:
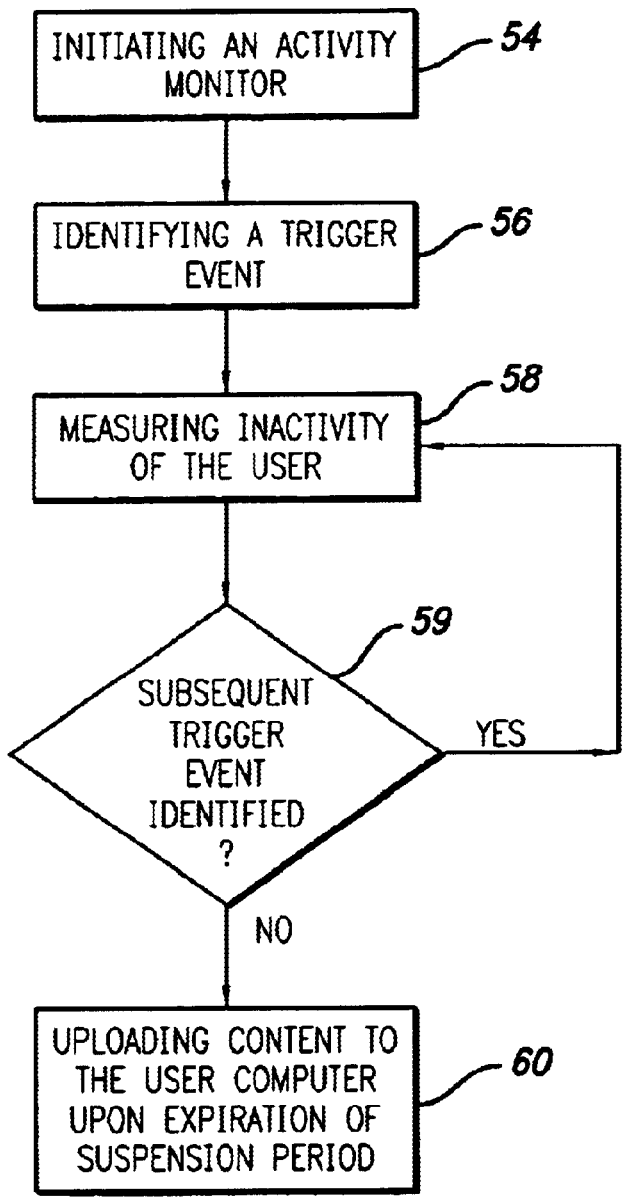
FIG. 4 is a block diagram of a preferred embodiment of displaying and presenting unsolicited content to a user computer.

With reference to FIG. 4, an embodiment of a preferred method of presenting unsolicited data to the user computer 12 comprises initiating the activity monitor 54, identifying a trigger event 56, measuring inactivity of the user 58, and uploading unsolicited content to the user computer 60.

Once the activity monitor 32 is coupled to the top most form of data, for example, the window 40, the monitor commences the process of identifying a trigger event 56. In one embodiment, a trigger event is the upload of the window. Trigger events can be any events defined by the provider. In some embodiments, trigger events are events performed by a user that indicate activity by the user. For example, trigger events include, but are not limited to, filling in form elements; exiting the window, but not closing the window, commonly known as blur; clicking on the mouse; depressing a key on the keyboard; a mouse over; and resetting the window size. The trigger events can include, but are not limited to, any or all of the above listed events. As seen, the trigger events are typically events that demonstrate an activity by the user.

Once the activity monitor identifies a trigger event, the timer is cleared and reset. The timer is then initiated such that the timer begins to count, or measure elapsed time 58. The timer measures the amount of elapsed time from the commencement of the timer and the next identified trigger event. If a subsequent trigger event is identified 59, the timer is cleared, reset and recommenced. This process continues clearing and resetting the timer upon the detection of a trigger event until a predefined suspension time has expired, wherein the predefined suspension time is a measurement of the amount of time of inactivity of the user in the browser window.

Once the suspension time has elapsed, the browser window downloads unsolicited content 60 to the user computer. If the browser window has been maintained as the foremost window, that is, the user has not changed applications, but rather, the user has not interacted with the browser window for the duration of the suspension time, the browser window loads the unsolicited content on top of the browser window, such that the user is presented with the unsolicited data upon return to the computer activities. If instead, the browser window is no longer the foremost window because the user has changed applications, for example, is now viewing E-mail, the browser window downloads the unsolicited content into the hidden browser window such that the user is unaware of the changed content of the browser window until the user returns to the browser window. In some embodiments, the user has the option of returning to the previously viewed page by depressing a return button, although any other means of returning the user to a previously viewed window is suitable.

In another embodiment, the timer is cleared and reset whenever an application other than the browser window is the foremost window. In this instance, the predefined suspension time period is reduced as the browser window is now hidden and the downloading of content over the browser window would not interrupt the user's current activities.

In still another embodiment, unsolicited content is downloaded if the user types in a new address on the address bar, wherein the user is presented with unsolicited content prior to the display of the requested content. Similarly, unsolicited content is downloaded when the user pulls down the "Favorites" menu on the browser window. In both instances, the user is no longer viewing the current browser window, and thus, the downloading of unsolicited content is not interruptive of the content currently being viewed by the user.

In operation, a user connects with the network system 16 and ultimately couples to the provider computer 14, wherein the user requests content. Upon the download of the content, the provider computer 14 further downloads an activity monitor 32. The activity monitor 32 is initiated upon the download, and commences waiting for a predefined trigger event. In preferred embodiments, the first trigger event is the opening of the requested browser window.

Upon the detection of a trigger event, the timer 38 of the activity monitor 32 is cleared and reset. The timer 38 commences to measure the amount of time between trigger events. For example, the timer 38 measures the amount of time between the time the browser window is opened and a mouse over. If a trigger event occurs prior to the expiration of the suspension period, the timer is cleared, reset and restarted such that the timer 38 again begins measuring the time elapsed between trigger events. If instead, the suspension period elapses, the activity monitor 32 signals the content transfer and display means 34, wherein the content transfer and display means 34 commences the downloading of unsolicited data over the browser window. When the user returns to the browser window, the user is presented with unsolicited data, such as, an advertisement. The user is presented with the option of reviewing the advertisement, returning to the browser window or exiting to a completely new window. However, the presentation of the advertisement is relatively unintrusive as the user's review of the browser window was not interrupted, but rather, the unsolicited content was downloaded when the user was engaged in activities other than reviewing the browser window.

Although the foregoing described the invention with embodiments having particular forms that have been illustrated and described, this is not intended to limit the invention. Rather, the foregoing is intended to cover all modifications and alternative constructions falling within the spirit and scope of the invention as expressed in the appended claims.

I claim:

1. A system for presenting unsolicited data over a wide area network to a user, wherein the user operates a browser in a user computer connected to the wide area network, the system comprising:

a server computer adapted for connecting to the wide area network;

content data for presentation in a web-browser window on the user computer, wherein the web-browser window is a stand-alone application operating on the user computer and is adapted to be displayed on a desktop of the user computer when activated, and the content data is stored in a memory of the server computer;

a monitoring application in a memory of the server computer, the monitoring application configured to be sent to the user with content data requested by the user, to be linked to at least the web-browser window such that the monitoring application is closed when the web-browser window is closed, and to automatically execute on the user computer after being received by the user, the monitoring application comprising instructions for monitoring browser activity of the user;

a server application in a memory of the server computer, the server application comprising instructions for receiving a request for the content data from the user, sending the content data to the user computer, and sending the monitoring application with the content data to the user computer; and unsolicited data for presentation to the user operating the user computer, the unsolicited data stored in a memory of the server computer;

wherein the server application further comprises instructions for receiving a request for the unsolicited data over the wide area network and for sending the unsolicited data to the computer of the user of the wide area network;

wherein the request for unsolicited data is generated by the monitoring application on the user computer and the unsolicited data is presented to the user operating the user computer only after a discontinuation of use by the user of the web-browser window presenting the content data for a predetermined period of time;

wherein the unsolicited data is presented to the user by the web-browser window presenting the content data; and wherein the unsolicited data remains on the web-browser window after a continuation of use by the user of the web-browser window.

2. The system of claim 1, wherein the unsolicited data can be presented to the user operating the user computer without first being cached in the user computer and wherein the web-browser window presents the unsolicited data to the user by replacing the content data with the unsolicited data.

3. The system of claim 1, wherein the monitoring application further comprises:

instructions for detecting occurrence of a first trigger event performed by the user;

instructions for detecting occurrence of a second trigger event performed by the user;

instructions for measuring an amount of time from the occurrence of the first trigger event; and instructions for comparing the amount of time measured with a predetermined amount of time.

4. The system of claim 3, wherein the monitoring application further comprises instructions for presenting the unsolicited data to the user operating the user computer if the amount of time measured is greater than the predetermined amount of time.

5. The system of claim 3, wherein the monitoring application further comprises instructions for resetting the amount of time measured if the amount of time measured at the occurrence of the second trigger event is not greater than the predetermined amount of time.

6. The system of claim 3, wherein the second trigger event is not an unload event.

7. The system of claim 3, wherein the monitoring application further comprises:

instructions for presenting the unsolicited data to the user operating the user computer if the amount of time measured is greater than the predetermined amount of time; and instructions for resetting the amount of time measured if the amount of time measured at the occurrence of the second trigger event is not greater than the predetermined amount of time.

8. A system for presenting unsolicited data over a wide area network to a user, wherein the user operates a browser in a user computer connected to the wide area network, the system comprising:

a server computer adapted for connecting to the wide area network;

first content data for presentation in a first web-browser window on the user computer, the first content data stored in a memory of the server computer;

second content data for presentation in a second web-browser window on the user computer, wherein the first and second web-browser windows are applications operating on the user computer and are adapted to be displayed on a desktop of the user computer when activated;

a monitoring application in a memory of the server computer, the monitoring application configured to be sent to the user with the first content data requested by the user, to be linked to at least one of the first and second web-browser windows such that the monitoring application is closed when the at least one of the first and second web-browser windows is closed, and to automatically execute on the user computer after being received by the user, the monitoring application comprising instructions for monitoring browser activity of the user;

a server application in a memory of the server computer, the server application comprising instructions for receiving a request for the first content data from the user, sending the first content data to the user computer, and sending the monitoring application with the first content data to the user computer for presentation in the first web-browser window; and unsolicited data for presentation to the user operating the user computer, the unsolicited data stored in a memory of the server computer;

wherein the server application further comprises instructions for receiving a request for the unsolicited data over the wide area network and for sending the unsolicited data to the computer of the user of the wide area network;

wherein the monitoring application further comprises (1) instructions for detecting occurrence of a first trigger event performed by the user, (2) instructions for detecting occurrence of a second trigger event performed by the user, (3) a timer for measuring an amount of time from the occurrence of the first trigger event and (4) instructions for comparing the amount of time measured with a predetermined amount of time; and wherein the request for unsolicited data is generated by the monitoring application on the user computer only if the amount of time measured is greater than the predetermined amount of time.

9. The system of claim 8, wherein the monitoring application further comprises instructions for presenting the unsolicited data to the user operating the user computer if the amount of time measured by the timer is greater than the predetermined amount of time.

10. The system of claim 8, wherein the monitoring application further comprises instructions for resetting the timer if the amount of time measured by the timer at the occurrence of the second trigger event is not greater than the predetermined amount of time.

11. The system of claim 8, wherein the monitoring application further comprises instructions for presenting the unsolicited data to the user operating the user computer if the amount of time measured by the timer is greater than the predetermined amount of time and instructions for resetting the timer if the amount of time measured by the timer at the occurrence of the second trigger event is not greater than the predetermined amount of time.

12. The system of claim 11, wherein the first trigger event is a discontinuation of use by the user of the second web-browser widow presenting the second content data and wherein the unsolicited data is presented to the user on the second web-browser window.

13. The system of claim 12, wherein the unsolicited data can be presented to the user operating the user computer without first being cached in the user computer and wherein the second web-browser window presents the unsolicited data to the user by replacing the second content data with the unsolicited data.

14. The system of claim 13, wherein the second trigger event is not an unload event.

15. A method for presenting unsolicited data over a wide area network to a user, wherein the user is operating a browser in a computer connected to the wide area network, the method comprising the steps of:

receiving a first request for first user-requested data from the user over the wide area network, wherein the first user-requested data is for presentation in a first web-browser window;

receiving a second request for second user-requested data from the user over the wide area network, wherein the second user-requested data is for presentation in a second web-browser window, wherein the first and second web-browser windows are applications operating on the user computer and are adapted to be displayed on a desktop of the user computer when activated;

sending the first and second user-requested data to the user over the wide area network;

sending program instructions for monitoring browser activity of the user to the user with the first user-requested data;

receiving a request for the unsolicited data over the wide area network, wherein the request for unsolicited data is generated by the program instructions; and sending the unsolicited data to the computer of the user of the wide area network;

wherein the program instructions are configured to automatically execute after being received by the user and linked to at least one of the first and second web-browser windows such that execution of the program instructions is terminated if the at least one of the first and second web-browser windows is closed;

wherein the program instructions perform the steps of (1) detecting occurrence of a first trigger event performed by the user, (2) detecting occurrence of a second trigger event performed by the user, (3) measuring an amount of time from the occurrence of the first trigger event, (4) comparing the amount of time measured with a predetermined amount of time, (5) requesting the unsolicited data and presenting the unsolicited data to the user operating the browser only if the amount of time measured is greater than the predetermined amount of time, and (6) resetting the amount of time measured if the amount of time measured at the occurrence of the second trigger event is not greater than the predetermined amount of time; and wherein the first trigger event comprises one of a discontinuation of use by the user of the first web-browser window presenting the first user-requested data and a discontinuation of use by the user of the second web-browser window presenting the second user-requested data; and wherein the unsolicited data remains presented to the user after a continuation of use by the user of the first web-browser window and the second web-browser window.

16. The method of claim 15, and wherein the first web-browser window is used to present the unsolicited data to the user, wherein the first web-browser presents the unsolicited data to the user by replacing the first user-requested data with the unsolicited and wherein the step of sending the unsolicited data further comprises including with the unsolicited data a presentation object for providing an option to the user to return the user-requested data back to the first web-browser window.

17. The method of claim 15, wherein the first trigger event is deemed to occur when the first web-browser window presenting the first user-requested data changes from a state of being foremost in the computer of the user to a state of being not foremost.

18. The method of claim 15, wherein the unsolicited data can be presented to the user without first being cached in the computer of the user.

19. The method of claim 15, wherein the program instructions for monitoring browser activity of the user further perform the step of determining whether the first web-browser window presenting the first user-requested data is a foremost window in the computer of the user, and if the first web-browser window presenting the first user-requested data is not the foremost window when the unsolicited data is about to be presented, presenting the unsolicited data in the first web-browser window.

20. The method of claim 15, wherein the program instructions for monitoring browser activity of the user further perform the step of determining whether the first web-browser window presenting the user-requested data is a foremost window in the computer of the user and, if the first web-browser window presenting the first user-requested data is the foremost window when the unsolicited data is about to be presented, presenting the unsolicited data in said second web-browser window that is not the foremost window.

* * * * *